2 Sheets--Sheet 1.

J. P. MANNY.
Harvester-Rake.

No. 114,165. Patented April 25, 1871.

Witnesses:
T. C. Brecht.
Baltis De Long.

Inventor:
John P. Manny
by his Atty.
Wm. D. Baldwin

J. P. MANNY.

Harvester-Rake.

No. 114,165.

Patented April 25, 1871.

United States Patent Office.

JOHN P. MANNY, OF ROCKFORD, ILLINOIS.

Letters Patent No. 114,165, dated April 25, 1871.

IMPROVEMENT IN HARVESTER-RAKES.

The Schedule referred to in these Letters Patent and making part of the same.

*To all whom it may concern:*

Be it known that I, JOHN P. MANNY, of Rockford, in the county of Winnebago and State of Illinois, have invented a new and useful Improvement in Harvester-Rakes, of which the following is a specification.

My invention relates to that class of automatic rakes for harvesters known as "reel-rakes."

Its object is to adapt such a rake to discharge the cut grain at the side of the machine out of the path of the team in its successive tours around the field; and The improvement consists in combining a finger-beam to sustain the cutting apparatus, a concave sector-shaped platform arranged behind the finger-beam, a rake-post mounted on the finger-beam or frame, and a series of reel and rake-arms mounted on a shaft inclined both upward and backward relatively to the finger-beam, as hereinafter set forth.

In the accompanying drawing, which shows so much only of a harvester as is necessary to illustrate the invention herein claimed—

Figure 1:
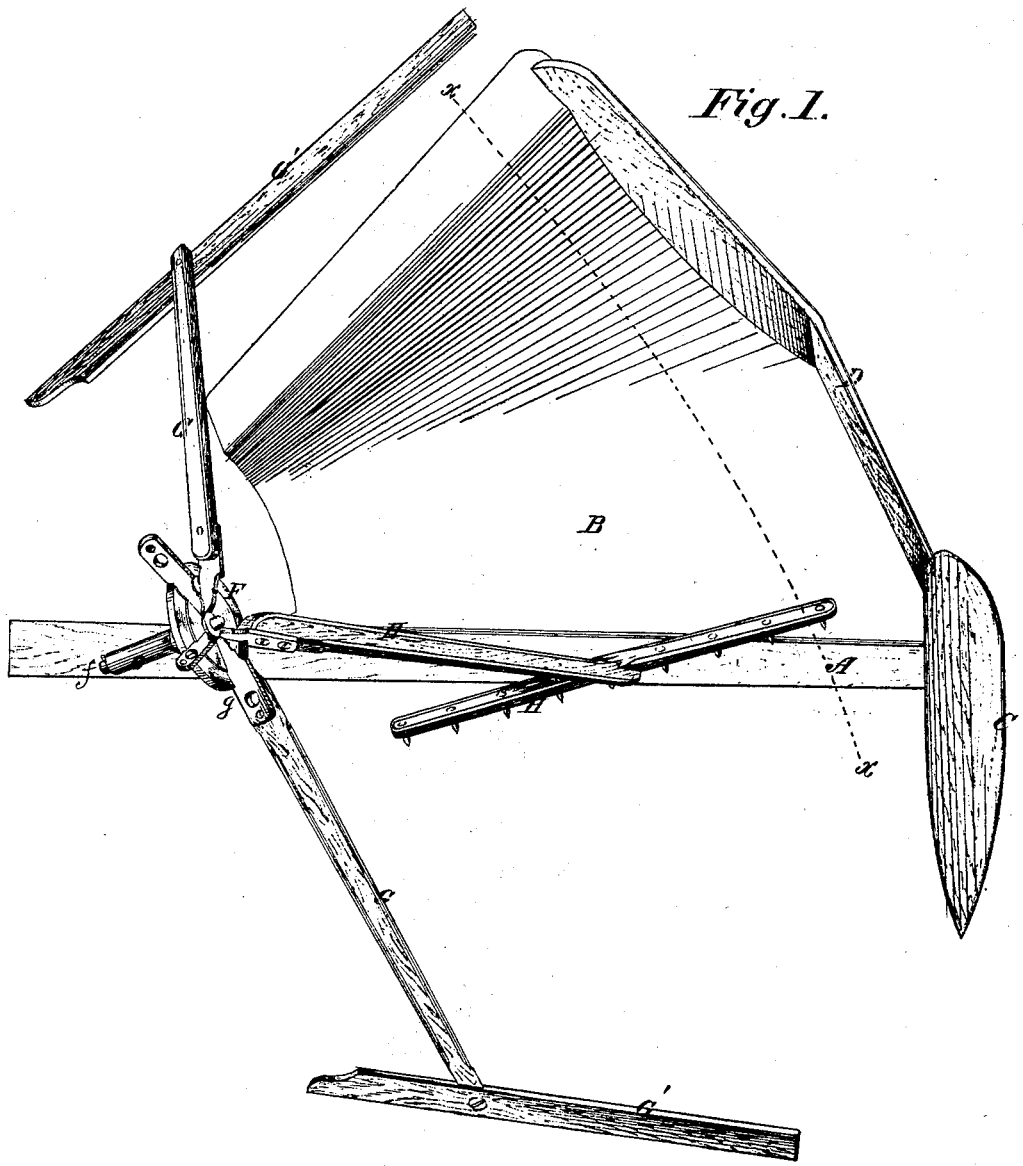
Figure 2:
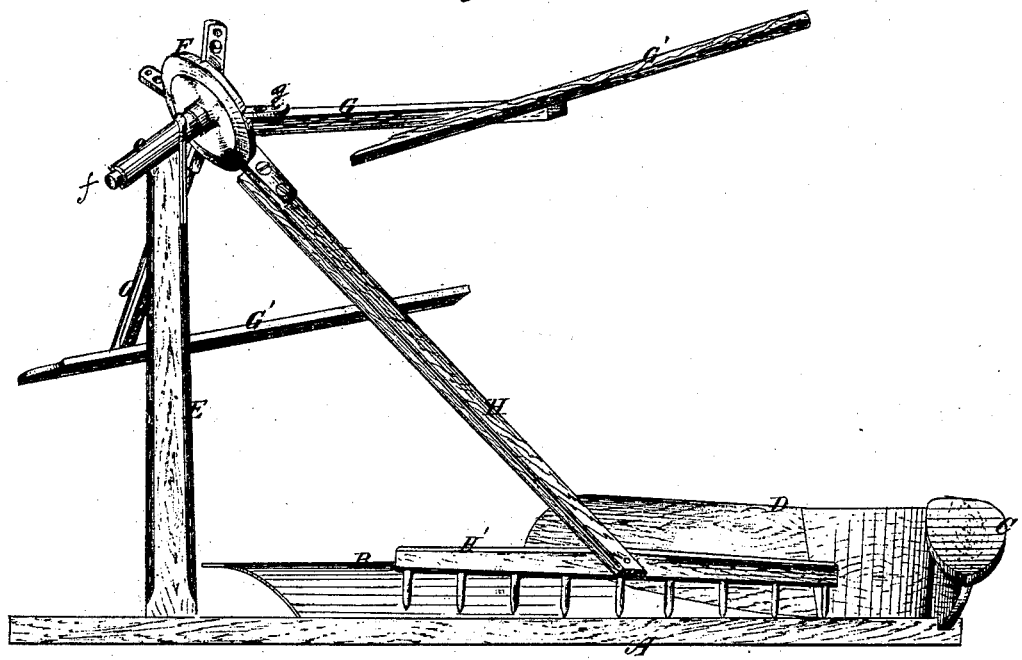
Figure 3:
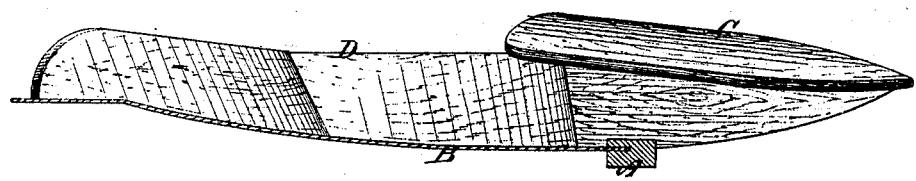

Figure 1 is a plan;
Figure 2, a front elevation; and
Figure 3, a vertical section through the platform.

The cutting apparatus is secured to a finger-beam, A, of well-known construction.

A platform, B, of the form shown in the drawing, is secured behind the finger-beam, and is provided with a divider, C, and fence or guard D, as usual.

A post, E, mounted on the finger-beam, supports a pipe-box bearing, $e$, in which the shaft $f$, of a hub, F, revolves. This shaft is inclined both upward and backward, as shown in the drawing, for a purpose hereinafter explained.

Reel-arms G, bolted to lugs $g$ on this hub, carry beaters G'.

To one of these lugs an arm, H, is secured; this arm carries the rake-head H'.

In operation, owing to the mode of construction hereinbefore described, the rake descends into the standing grain somewhat in advance of the cutters, and diagonally inclined thereto, as shown in fig. 1, and sweeps the grain, when cut, diagonally back over the platform, discharging it at its rear end.

Owing to the concavity of the platform, and the angular arrangement of the rake-shaft relatively to the finger-beam, the gavel is compressed and discharged in a compact condition by a rake, without the use of the cams or complex gearing usually employed for this purpose.

I do not broadly claim a combined reel and rake, a concave platform, or an inclined rake-shaft, as these elements are all old.

I claim as my invention—

The combination of the finger-beam, the concave sector-shaped platform, the rake-post, the hub revolving on a shaft inclined backward and upward relatively to the finger-beam, and the rake and reel-arms, all rigidly secured upon the hub revolving in a uniform path and with uniform speed, all these members being constructed, arranged, and operating in combination as hereinbefore described.

In testimony whereof I have hereunto subscribed my name.

JOHN P. MANNY.

Witnesses:
WILLIAM C. BLINN,
LEWIS A. WEYBURN.